United States Patent [19]

Pope et al.

[11] Patent Number: 5,589,293
[45] Date of Patent: Dec. 31, 1996

[54] SEALED GALVANIC CELL WITH INJECTION MOLDED TOP

[75] Inventors: Peter J. Pope, Balcumbe; Richard B. Willis-Owen, West Sussex, both of Great Britain

[73] Assignee: Duracell Inc., Bethel, Conn.

[21] Appl. No.: 623,701

[22] PCT Filed: Mar. 31, 1989

[86] PCT No.: PCT/US89/01365

§ 371 Date: Dec. 14, 1990

§ 102(e) Date: Dec. 14, 1990

[87] PCT Pub. No.: WO89/11164

PCT Pub. Date: Nov. 16, 1989

[30] Foreign Application Priority Data

May 5, 1988 [GB] United Kingdom ............... 8810651

[51] Int. Cl.⁶ .................................................. H01M 2/08
[52] U.S. Cl. ............................ 429/172; 429/53; 429/54; 429/82; 429/185

[58] Field of Search .................. 429/53, 54, 82, 429/171, 174, 185, 251, 172

[56] References Cited

U.S. PATENT DOCUMENTS 4,476,200 10/1984 Markin et al. ................. 429/185
4,756,982 7/1988 McCartney, Jr. et al. ........... 429/54

OTHER PUBLICATIONS

Kirk–Othmer Encyclopedia of Chemical Technology Third Edition vol. 15, p. 437; vol. 18 p. 172; vol. 22 p. 530 (1981).

*Primary Examiner*—George Fourson
*Assistant Examiner*—C. Everhart
*Attorney, Agent, or Firm*—Robert J. Feltovic; Rose M. Allen; Barry D. Josephs

[57] ABSTRACT

A sealing and insulating member for a cylindrical galvanic cell wherein said member comprises a plurality of vent membranes of non-circular configuration. The seal can readily be made from mineral filled polyolefin material by injection molding.

7 Claims, 1 Drawing Sheet

SEC. A-A

SEALED GALVANIC CELL WITH INJECTION MOLDED TOP

This invention relates to sealed electrochemical cells, such as primary alkaline cells, and more particularly to an improved sealing and insulating member for such cells. In accordance with the invention, multiple vent sections are provided, each having a thickness which is easier to form by injection molding than the thicknesses necessitated when a single vent section is used.

The general construction of sealed, cylindrical galvanic cells is such that the principal components, an anode and a cathode, are assembled into a can, together with the appropriate separators, electrolyte, etc. Generally, the can into which the principal cell components are assembled is a positive cathode contact, i.e. the can, and usually the bottom end thereof, forms a cathode contact for the cell and the cell is closed by a member placed in the top end of the can. Such member is generally a sealing and insulating member, by which the cell is sealed so as to preclude electrolyte leakage therefrom, and so that the anode contact of the cell is insulated from the can at the opposite end thereof from its closed bottom end. Said sealing and insulating member, hereinafter referred to as the top member is typically formed from a polymeric material which can be injection molded.

It is common to include a vent membrane that is integrally formed in the top member. The vent membrane is generally of a thickness less than the surrounding thickness of the top member so that the membrane can rupture at a predetermined internal pressure. Top members having a variety of vent designs are disclosed in U.S. Pat. Nos. 4,191,806; 4,237,203; and 4,476,200. The top member disclosed in U.S. Pat. No. 4,476,200 is injection molded using a polypropylene material having a melt index between 4 and 30. A melt index in this range permits the injection molding of very thin vent membranes. U.S. Pat. No. 4,191,806 teaches that it is difficult to form thin vent membranes when harder plastics are used to make top members by injection molding. In order to get proper venting, this patent discloses forming grooves in the vent membrane.

Mineral filled polyolefins comprise a class of materials which poses particular problems for making top members by the injection molding process. Mineral filled sealing members are disclosed in Great Britain Patent No. 2,149,198. These materials have a high viscosity when melted, making it difficult to form thin vent membranes in the top member by injection molding. One problem is that vent membranes cannot be made thin enough because the mineral filled polyolefins do not easily flow through the thin section of the injection mold. To overcome this problem the membrane can initially be formed thicker than desired and a moving pin member of the mold used to further compress the vent membrane section down to the desired thickness. In this manner it is possible to form vent membranes having a thickness ranging from 0.0025" to 0.005" depending on the particular cell size. However, this method does not produce consistently uniform top members and there is variability in the pressure required to rupture the membrane. Another problem encountered when using mineral filled polyolefins is that a seam often forms during injection molding where the material flowing from different directions through the mold meet. This seam imparts a fracture zone in the top member.

Thus, it is seen that there is a need for a top member design which can be easily injection molded using filled polyolefins and which incorporates a reliable vent membrane that is easily molded.

The features and advantages of the present invention will be more fully discussed below with reference to the accompanying figures in which.

Figure 1:
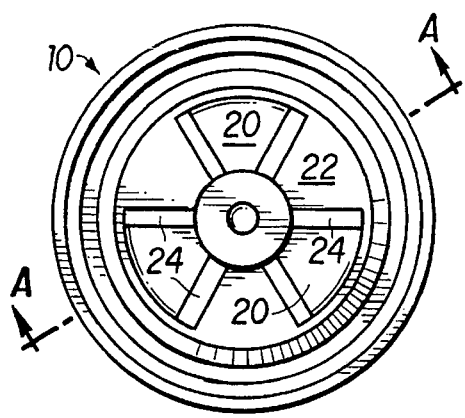
FIG. 1 shows a top view of a sealing and insulating member made in accordance with the present invention.
Figure 2:
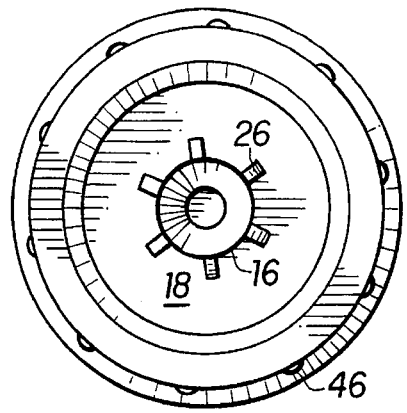
FIG. 2 shows a bottom view of the sealing and insulating member of FIG. 1.
Figure 3:
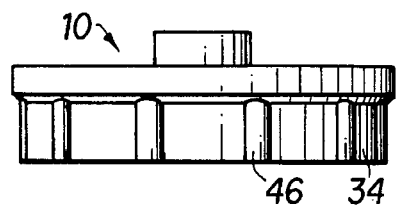
FIG. 3 shows a side view of the sealing and insulating member of FIG. 1.

Referring now to FIGS. 1–5, there is shown a typical sealing and insulating member made according to the present invention and of a type which could be used for sealed alkaline cells. The top member shown in the Figures is designed for use in a AA size alkaline cell. However, it would be readily apparent to one skilled in the art, based on the considerations set forth below, how to modify the multiple vent design for use in other cells.

The top sealing and insulating member 10 has a disc shaped platform 18 which is comprised of alternating thin sections 20 and thick sections 22 and a central cylindrical boss portion comprised of an upper portion 14 and a lower portion 16. The thin sections 20 of platform 18, discussed more fully below, function as vent membranes for top member 10. In the presently preferred form of the invention a frustoconical member 36 depends downwardly from the circumference of the central platform 18. An annular bottom member 38 extends outwardly from the lower end of frustoconical member 36 and then extends upwardly forming outer wall 34 which includes an outwardly directed shoulder 42, and an upper skirt 44. The frustoconical member 36, the annular bottom member 38, and the lower portion of outer wall 34 form a circumferential well which is capable of containing any cell contents which might escape during venting.

As stated above, platform 18 includes thin and thick sections 20,22. The number of alternating thin and thick sections may vary. For a AA size alkaline cell it is preferred that the top member 10 comprises three thin sections 20 and three thick sections 22. The surface area and thickness of each vent membrane 20 are determinative of the pressure necessary to rupture the vent. If the surface area of an individual membrane is too large the membrane can balloon outwardly as the internal cell pressure rises. Such effect can render the vent unreliable because the point where the balloon breaks is unpredictable. Therefore, to keep the ballooning effect to a minimum, the surface area of each vent should not exceed a particular value. For the AA top member described herein, this value is approximately one sixth of the surface area of the annular member 18. Vent membranes 20 should all be of substantially equal size and thickness so that they are all designed to vent at approximately the same pressure.

Figure 4:
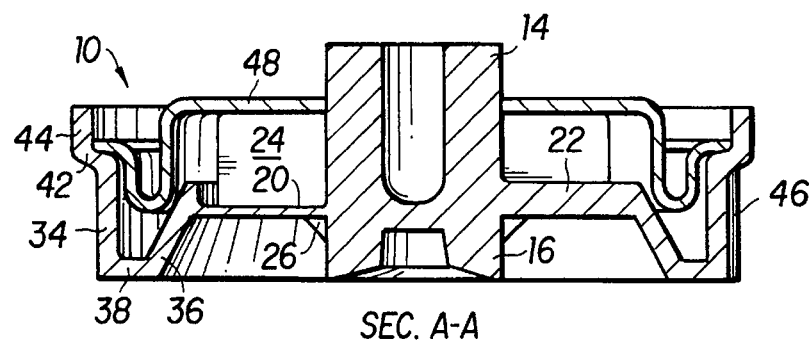
FIG. 4 shows a vertical cross section through the top member of Figure, taken along the line A—A.

The top member 10 is frequently used in conjunction with a metal reinforcement ring 48 as shown in FIG. 4. The reinforcement ring provides support to the top member 10 during crimping. Thus, it can be seen from FIG. 4 why ballooning of the vent membranes 20 should be kept to a minimum. If vent membranes 20 ballooned outwardly so as to contact reinforcement ring 48 the membrane would not break and internal cell pressure would continue to rise.

The high vent membrane surface area permits the use of a thicker vent membrane without increasing the pressure necessary to achieve venting. For example, a AA size cell having a top member as shown in FIG. 1 has an overall diameter of about 1.3 cm (0.5 in.). Each vent membrane has a thickness of 0.018–0.02 cm (0.007 to 0.008 in.) and an area of about 0.06 cm$^2$ (0.009 in$^2$) which is about 17% of the area of the platform area excluding the boss. For example, a AA cell having such a top may desirably be designed to vent at a pressure on the order of 1100 psi. For comparison, a single circular vent membrane fitting within a 60° section of the annular member has an area of about 0.04 cm$^2$ (0.006 in$^2$) and requires the use of a thinner membrane, e.g. one having a thickness between 0.006–0.012 cm (0.0025 to 0.005 in.) to vent at about 1100 psi. The thicker vent membranes which can be used in the top member of the present invention can more easily be molded by injection molding without the need for moving pins. Depending on the cell size the vent membrane thickness can vary from as little as 0.006 cm (0.0025 in) for cells smaller than AA to as much as 0.04 cm (0.016 in) for larger cells such as C and D size. Further, if the gate for injecting the molten polymer into the mold is located at the center, i.e. where the central boss portion is located, the vent membranes are formed evenly as the molten material flows outwardly towards the circumference of the top member. In this manner no seams or fracture zones are formed. This results in much more reliable vent characteristics of the top member 10.

Two additional benefits to using the top design of the present invention are improved reliability of the multiple vent structure and enhanced diffusion of hydrogen gas. With respect to reliability, the multiple vent top operates as follows. While each vent membrane is roughly of equal size, configuration, and thickness and will theoretically vent at the same pressure, it is probable that only one vent will initially open to relieve internal pressure. In some instances when a cell vents the cell contents can be partially expelled. This can plug the vent opening causing internal pressure to further increase. The present invention provides for a second venting to occur with one of the remaining vent membranes. In contradistinction, for a cell top with one membrane a second venting could not occur and internal pressures could rise to undesirably high levels. As the number of vent membranes increases, e.g. with a cell top with three vents as shown in FIG. 1, the reliability of the mechanism is increased and release of internal pressure is assured.

The top design of the present invention provides for enhanced hydrogen diffusion because of the high surface area of the combined vent membranes. This is of particular benefit in alkaline cells where small amounts of hydrogen gas are generated during the life of a cell. The total vent area discussed above with reference to the figures is approximately 45–50% of the total area of the central platform (not includung the area occupied by the boss discussed above). While a total vent area of at least 30% (i.e. each vent is 10%) of the platform would vent properly, it is desirable to use a higher vent surface area in order to enhance hydrogen diffusion. Therefore, it would be desirable to maximize the vent area to maximize hydrogen diffusion, while at the same time not comprimising the structural integrity of the top. If the trickle venting of hydrogen gas was the most important criteria in designing a top then the optimum design would be a platform comprised entirely of thin vent sections, separated by the vertical support ribs discussed below. Thus, depending on the desired result, the present invention encompasses a top having multiple vent sections wherein the total vent area ranges from 30% to 100% of the platform surface area.

It is preferred that top member 10 further comprises vertical stiffening ribs 24 which extend upward and radially outwardly from the central boss member. Ribs 24 are formed at the junction of the thin sections 20 and thick sections 22. It is preferred that the ribs extend outwardly to slightly less than the outer circumference of the platform disc and extend upwardly to slightly less than the height of outer wall 34. These ribs provide additional structural support to help minimize the ballooning of the membranes 20. Buttress support members 26 are provided on the underside of top member 10 to provide further strength. The buttress supports 26 are preferably located in a position opposite corresponding ribs 24 on the upperside thereof.

Vertical ribs 46 extend in an axial direction along the outer surface of wall 34. The ribs 46 are preferably spaced equidistantly around the outer surface of wall 34. The number and size of vertical ribs 46 will depend on the cell size. For a AA size cell, as shown in FIGS. 1–5, the top may have 10 such vertical ribs. Ribs 46 are designed to create a force fit with a portion of the inner wall of a cell casing. Thus, after an anode, cathode, and separator are placed inside a cell casing, top member 10 is pressed into place and there held in place by ribs 46. The cells can then be handled without fear of losing the cell contents before the cell is finally crimped.

Figure 5:
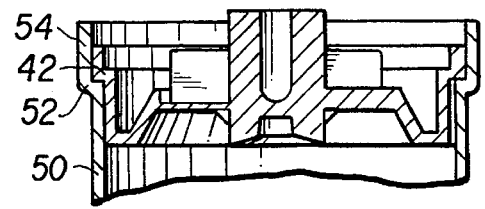
FIG. 5 shows a vertical cross section through the upper portion of an uncrimped galvanic cell with a stepped can and a top member made in accordance with the present invention.
Figure 6:
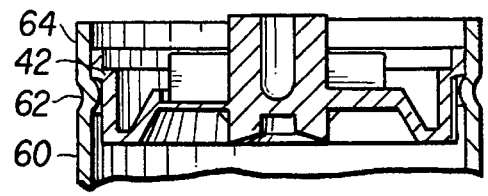
FIG. 6 shows a vertical cross section through the upper portion of an uncrimped galvanic cell with a beaded can and a top member made in accordance with the present invention.

There are two common types of crimped seals in general use in electrochemical cells. One type employs a stepped casing and the other type employs a beaded casing. FIG. 5 shows how shoulder 42 of top 10 engages with the step 52 of a stepped cell type of casing 50. Outing crimping a portion 54 of cell casing 50 will be crimped radially inward against skirt 44 of top 10 creating a seal therebetween. Similarly, FIG. 6 shows how shoulder 42 of top 10 will engage the inwardly directed bead 62 of a beaded cell type casing 60 whereupon a portion 64 of cell casing 60 can similarly be crimped radially inward against top 10.

As stated previously, the top 10 is preferably formed from a filled polyolefin material. Preferably, the material is a mineral filled polypropylene wherein the mineral is selected from the group consisting of talc, calcium carbonate, mica, and mixtures thereof. The mineral filler is present in quantities up to 45% and preferably 15% to 40%. The filler material is very finely ground or is a fine particulate material. Substantially no exposure of the filler material appears on the surface of the molded part. In this regard, it is most preferred that approximately 20% filler be used in the top member. An example of a presently preferred material is 20% talc filled polypropylene.

In cylindrical cells, the central electrode is commonly in the form of a nail, inserted through the top or closure member of the cell. The stiffening ribs 24 serve also to provide strength between the central boss and the platform during insertion of the nail electrode through a membrane provided in an axial bore of the boss, in order to resist fracture of the top during insertion of the nail electrode.

Embodiments other than those referred to specifically above, and materials other than those mentioned, may of course be used, and other sealed systems may utilize the present invention without departing from the spirit and scope of the appended claims.

What is claimed is:

1. A top for sealing and insulating the open end of a cylindrical container subject to internal pressure variations, said top comprising means to support the top and a sealing and insulating member, said sealing and insulating member comprising a central platform having an axially extending boss, with said platform having a plurality of vent membranes integrally formed therein, wherein each vent is designed to vent at approximately the same pressure, said membranes in combination comprising between at least about 30% of the surface area of said platform exclusive of said boss portion, and means to strengthen the top, wherein said platform is disc shaped and said vent membranes comprise up to about 50% of the platform surface area and are equidistantly spaced around the surface of said disc and are separated from each other by thicker, non-venting portions of said platform, wherein said means to strengthen the top comprises vertically extending stiffening ribs which extend radially from the central boss member, and each rib being integral with the upper surface of the platform at the juncture of a vent membrane and an adjacent non-venting portion thereof, and wherein said sealing and insulating member further comprises a downwardly depending frustoconical member attached to the outer circumference of the platform; an annular bottom member attached at its inner circumference to the lower end of the frustoconical member; and an upwardly extending outer wall attached to the outer circumference of the annular bottom member.

2. A top for sealing and insulating the open end of a cylindrical container subject to internal pressure variations, said top comprising means to support the top and a sealing and insulating member, said sealing and insulating member comprising a central platform having an axially extending boss, with said platform having a plurality of vent membranes integrally formed therein, wherein each vent is designed to vent at approximately the same pressure, said membranes in combination comprising between at least about 30% of the surface area of said platform exclusive of said boss portion, and means to strengthen the top, wherein said platform is disc shaped and said vent membranes comprise up to about 50% of the platform surface area and are equidistantly spaced around the surface of said disc and are separated from each other by thicker, non-venting portions of said platform, wherein said means to strengthen the top comprises vertically extending stiffening ribs which extend radially from the central boss member, and each rib being integral with the upper surface of the platform at the juncture of a vent membrane and an adjacent non-venting portion thereof, and wherein said sealing and insulating member further comprises a downwardly depending frustoconical member attached to the outer circumference of the platform; an annular bottom member attached at its inner circumference to the lower end of the frustoconical member; and an upwardly extending outer wall attached to the outer circumference of the annular bottom member, said outer wall including an outwardly extending shoulder.

3. A top for sealing and insulating the open end of a cylindrical container subject to internal pressure variations, said top comprising means to support the top and a sealing and insulating member, said sealing and insulating member comprising a central platform having an axially extending boss, with said platform having a plurality of vent membranes integrally formed therein, wherein each vent is designed to vent at approximately the same pressure, said membranes in combination comprising between at least about 30% of the surface area of said platform exclusive of said boss portion, and means to strengthen the top, wherein said platform is disc shaped and said vent membranes comprise up to about 50% of the platform surface area and are equidistantly spaced around the surface of said disc and are separated from each other by thicker, non-venting portions of said platform, wherein said means to strengthen the top comprises vertically extending stiffening ribs which extend radially from the central boss member, and each rib being integral with the upper surface of the platform at the juncture of a vent membrane and an adjacent non-venting portion thereof, and wherein said sealing and insulating member further comprises a downwardly depending frustoconical member attached to the outer circumference of the platform; an annular bottom member attached at its inner circumference to the lower end of the frustoconical member; and an upwardly extending outer wall attached to the outer circumference of the annular bottom member, wherein said sealing and insulating member further comprises buttress support members extending outwardly from said boss member and attached to the lower surface of the platform opposite the vertical support ribs on the upper surface thereof.

4. A top for sealing and insulating the open end of a cylindrical container subject to internal pressure variations, said top comprising means to support the top and a sealing and insulating member, said sealing and insulating member comprising a central platform having an axially extending boss, with said platform having a plurality of vent membranes integrally formed therein, wherein each vent is designed to vent at approximately the same pressure, said membranes in combination comprising between at least about 30% of the surface area of said platform exclusive of said boss portion, and means to strengthen the top, wherein said platform is disc shaped and said vent membranes comprise up to about 50% of the platform surface area and are equidistantly spaced around the surface of said disc and are separated from each other by thicker, non-venting portions of said platform, wherein said means to strengthen the top comprises vertically extending stiffening ribs which extend radially from the central boss member, and each rib being integral with the upper surface of the platform at the juncture of a vent membrane and an adjacent non-venting portion thereof, and wherein said sealing and insulating member further comprises a downwardly depending frustoconical member attached to the outer circumference of the platform; an annular bottom member attached at its inner circumference to the lower end of the frustoconical member; and an upwardly extending outer wall attached to the outer circumference of the annular bottom member, wherein said outer wall includes vertical ribs on the outer surface of said wall and said sealing and insulating member further comprises buttress support members extending outwardly from said boss member and attached to the lower surface of the platform opposite the vertical support ribs on the upper surface thereof.

5. A sealed electrochemical cell having an anode, a cathode, a cylindrical can having an open end, and a sealing and insulating member located in the open end of the cell can, wherein said sealing and insulating member comprises a central platform having an axially extending central boss, with said platform having a plurality of vent membranes integrally formed therein which membranes comprise at least about 30% of the surface area of the platform exclusive of the boss portion, said vent membranes comprising up to about 50% of the platform surface area and said sealing and insulating member is made from a mineral filled polyolefin, wherein said sealing and insulating member further comprises a downwardly depending frustoconical member attached to the outer circumference of the platform; an annular bottom member attached at its inner circumference to the lower end of the frustoconical member; and an upwardly extending outer wall attached to the outer circumference of the annular bottom member; and wherein said outer wall includes an outwardly extending shoulder.

6. A sealed electrochemical cell having an anode, a cathode, a cylindrical can having an open end, and a sealing and insulating member located in the open end of the cell can, wherein said sealing and insulating member comprises a central platform having an axially extending central boss, with said platform having a plurality of vent membranes integrally formed therein, said vent membranes each having a surface substantially in the shape of a sector of a circle, each sector bounded by a pair of stiffening ribs which extend radially from the central boss, which membranes comprise at least about 30% of the surface area of the platform exclusive of the boss portion, wherein said vent membranes comprises up to about 50% of the platform surface area and said sealing and insulating member is made from a mineral filled polyolefin, and wherein said cylindrical can has an outwardly directed step located near its open end such that the shoulder of the sealing and insulating member engages with the step.

7. A sealed electrochemical cell having an anode, a cathode, a cylindrical can having an open end, and a sealing and insulating member located in the open end of the cell can, wherein said sealing and insulating member comprises a central platform having an axially extending central boss, with said platform having a plurality of vent membranes integrally formed therein, said vent membranes each having a surface substantially in the shape of a sector of a circle, each sector bounded by a pair of stiffening ribs which extend radially from the central boss, which membranes comprise at least about 30% of the surface area of the platform exclusive of the boss portion, wherein said vent membranes comprise up to about 50% of the platform surface area and said sealing and insulating mender is made from a mineral filled polyolefin, and wherein said cylindrical can has an inwardly directed bead located near the open end of the can such that the shoulder of the sealing and insulating member engages with the bead.

* * * * *